United States Patent [19]

Hankammer

[11] Patent Number: 4,623,457
[45] Date of Patent: Nov. 18, 1986

[54] WATER PURIFIER

[76] Inventor: Heinz Hankammer, Baumgartenstrasse 51, 6204 Taunusstein 4, Fed. Rep. of Germany

[21] Appl. No.: 722,792

[22] Filed: Apr. 12, 1985

[30] Foreign Application Priority Data

Apr. 13, 1984 [DE] Fed. Rep. of Germany ....... 3413948

[51] Int. Cl.⁴ ............................................. B01D 35/00
[52] U.S. Cl. .................................... 210/237; 210/472; 210/475; 210/478; 210/479; 210/481; 210/482
[58] Field of Search ............... 210/473, 474, 475, 477, 210/478, 479, 481, 482, 237, 120, 472; 222/465 R, 189

[56] References Cited

U.S. PATENT DOCUMENTS 421,777 2/1890 Stanton ............................... 222/189

Primary Examiner—Frank Sever
Attorney, Agent, or Firm—Donald C. Studley; Michael L. Dunn

[57] ABSTRACT

Described is a water purifier comprising a collecting container (1) with pouring spout (2) and handle (3), a funnel and a cover (5) which can close the funnel, wherein provided at the bottom of the funnel is an opening for receiving a filter cartridge containing a purifying agent. For the purposes of inexpensive manufacture and for practical use by the final consumer, in particular for easily opening and filling and conveniently emptying the purifier, it is provided in accordance with the invention that the funnel is removably at least partially arranged in the approximately cylindrically shaped collecting container (1) and has approximately cylindrical funnel walls matching thereto, has a projection portion which is disposed for being arranged on the handle (3) formed on the collecting container (1) and has the bottom opening concentrically at the side of the projection portion, and is provided with a bulge portion at the end on the pouring side, in the region of the wide conical pouring spout (2) which is formed on the collecting container (1), and that the cover (5) has a lower sealing cone, a gripping knob (16) on its top and, preferably rearwardly, has a projection portion for being at least partially arranged on the handle (3) of the collecting container (1).

10 Claims, 20 Drawing Figures

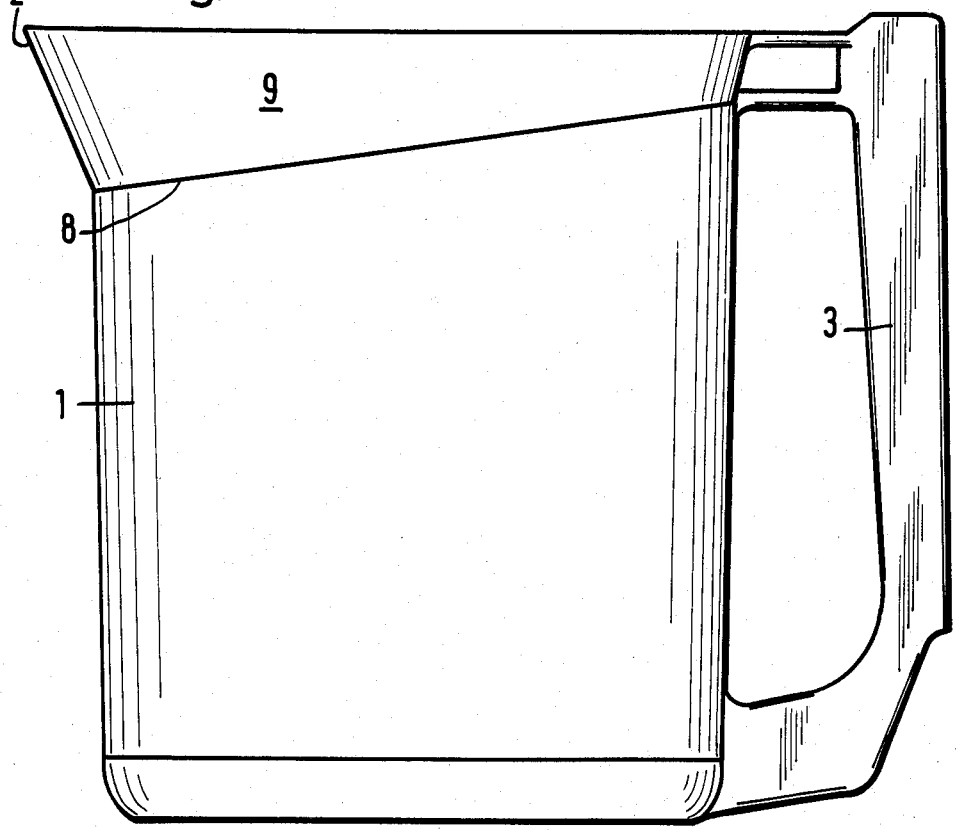

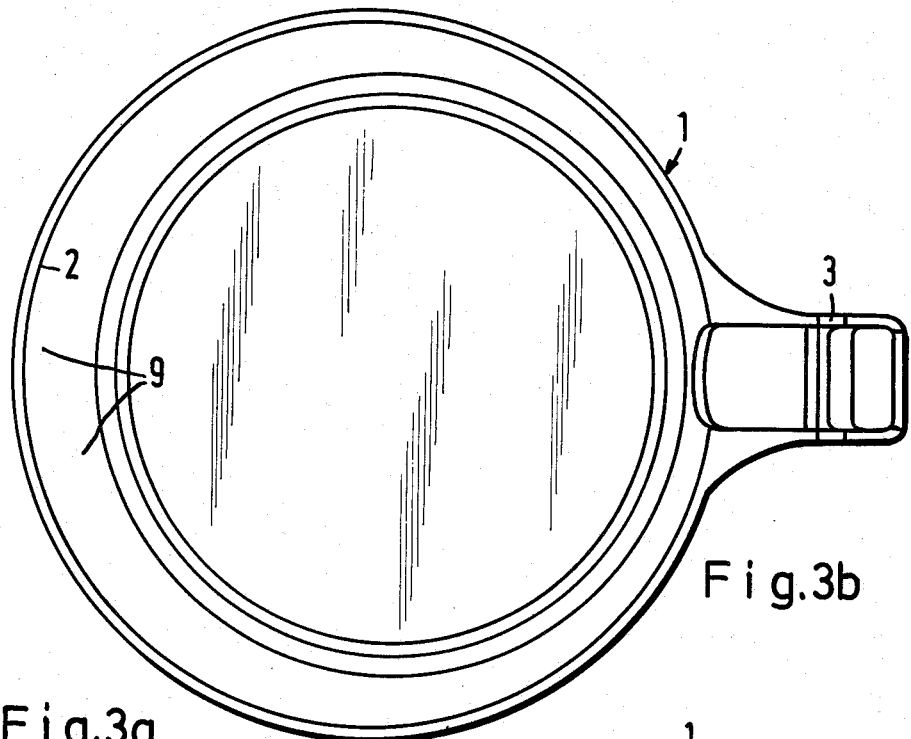
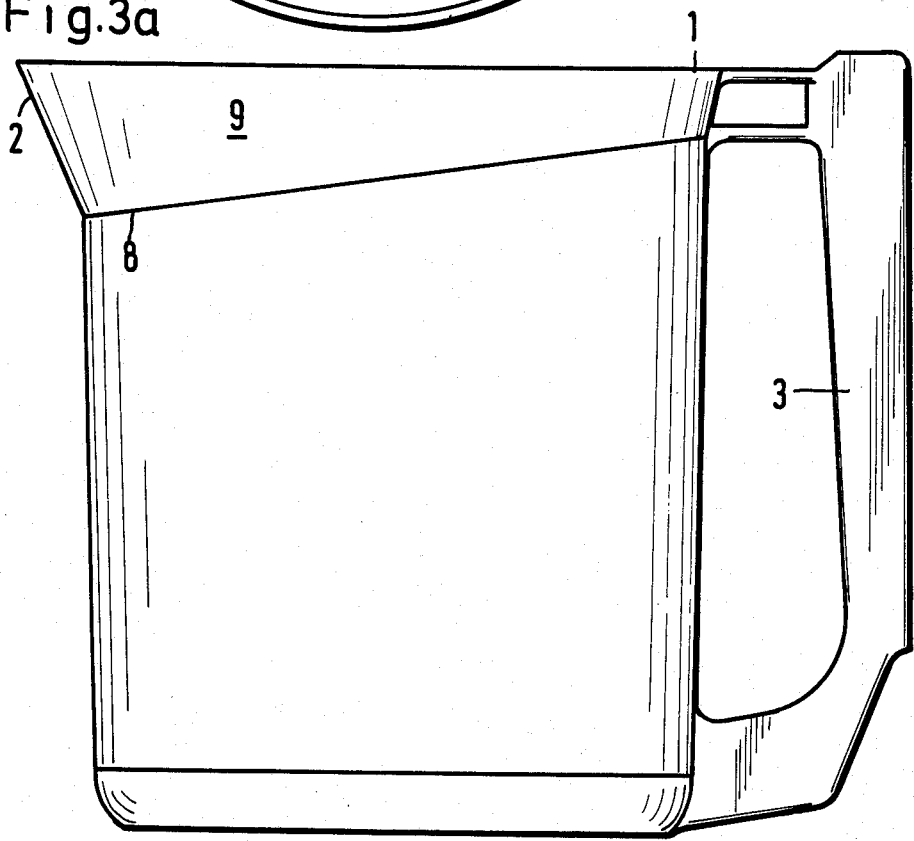
Fig.3b
Fig.3a

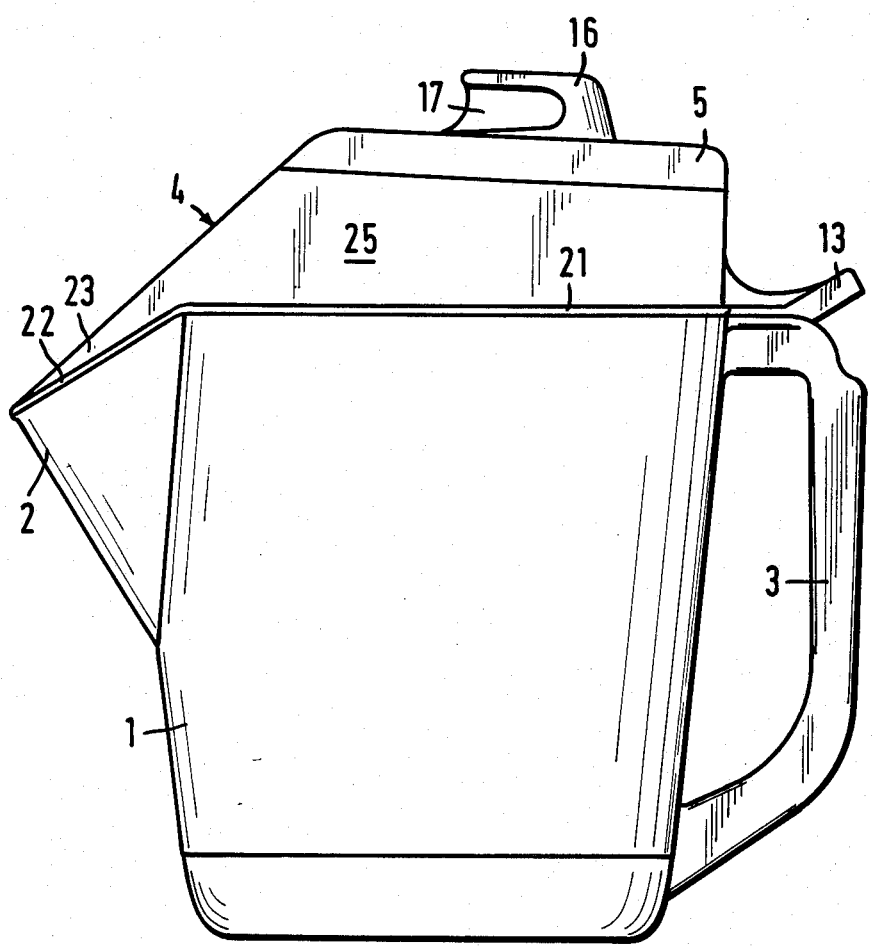

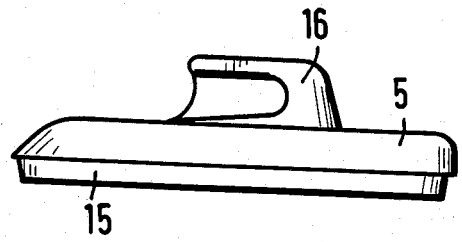
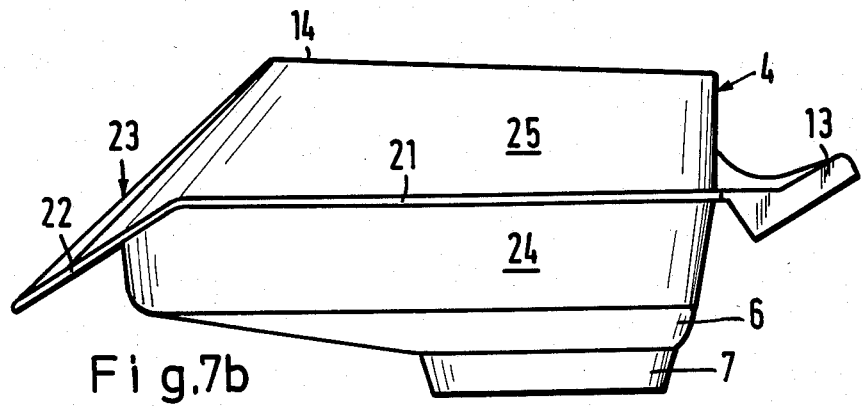
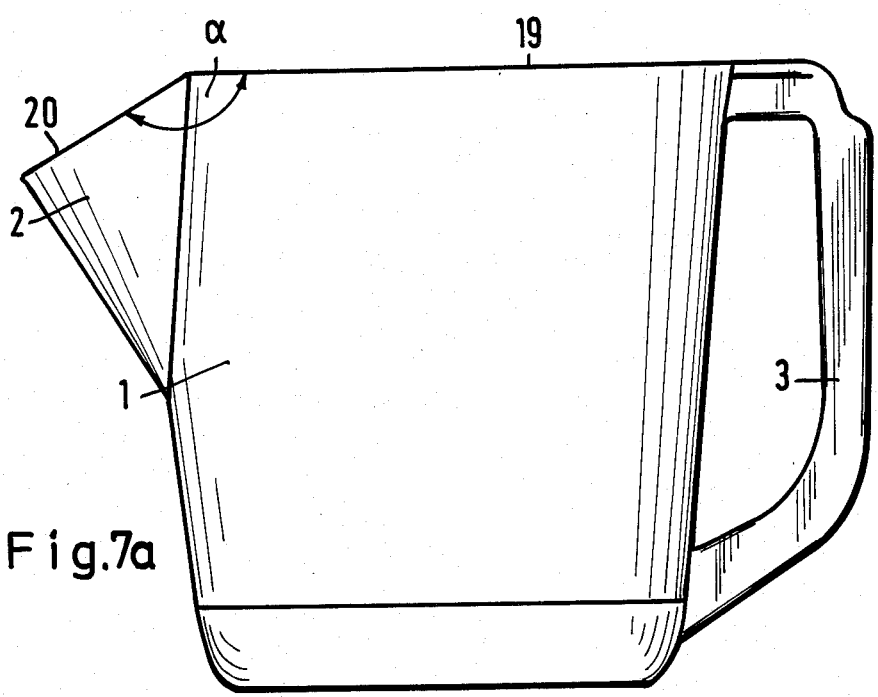

WATER PURIFIER

The invention relates to a water purifier comprising a collecting container with pouring spout and handle, a funnel and a cover for closing the funnel, wherein provided at the bottom of the funnel is an opening for receiving a filter cartridge containing a purifying agent.

Water purifiers of that kind are known. There are those purifiers in which the funnel has fitted thereto a sleeve into which the purifying agent is loosely introduced and which is thereafter closed upwardly by a sieve or filter means. There are also those purifiers in which a filter cartridge which is closed on all sides is secured to the funnel by a sealing clamping action. In connection with the cartridge, it will be appreciated that sieve or filter-like closure members are arranged at the two ends (being the upper and lower ends) of the filled sleeve. Provided within the sleeve and the closure members is a space for accommodating a granular purifying agent which is not soluble in water. It has been found that the final consumer does not always fill the filter cartridge in the prescribed manner. It is therefore preferable to provide a filter cartridge which has already been filled, for use on the funnel. That provides the maximum degree of hygene, in particular avoiding undesirable infection.

In the previous water purifiers, the funnel, with the filter cartridge fitted to the underside thereof, was placed on a collecting vessel or container so that serious disadvantages in handling occurred both when opening the purifier and also when pouring it out and closing it. The individual components such as the collecting container, the funnel and the cover were only loosely positioned one upon the other, in such a way that the final consumer was not provided with a practical and compact piece of equipment. In addition, the unfavorable distribution of weight frequently gave rise to difficulties in handling the purifier and in particular when pouring it out because the purifying agent in the filter cartridge and, when pouring out the purifier, also the liquid therein, were at a comparatively large distance from the handle, thus giving rise to unfavourable conditions in regard to tilting of the purifier.

The invention is therefore based on the problem of providing a water purifier of the kind set forth in the opening part of this specification, which can be inexpensively produced and which is a practical proposition for use from the point of view of the final consumer, that is to say it is in particular easy to open and to fill and is convenient to empty, with a favourable distribution of weight.

According to the invention, that problem is solved in that the funnel is removably at least partially arranged in the approximately cylindrically shaped collecting container and has funnel walls which are matchingly of approximately cylindrical shape, has a projection portion disposed for arrangement on the handle formed on the collecting container, and has the bottom opening eccentrically on the side of the projection portion, and is provided with a bulge portion at the end towards the pouring side, in the region of the wide, conical pouring spout which is formed on the collecting container and that the cover has a lower sealing cone, on its top it has a gripping knob, and rearwardly it has a projection portion for at least partial arrangement thereof in the handle of the collecting container. The novel water purifier is thereby of a more compact construction and is better to use from the point of view of the final consumer. The new filter cartridge which is available on the market is fitted into the bottom opening in the funnel and can be more easily handled by the final consumer for the reason that the bottom opening is disposed eccentrically in the funnel, namely at the side of the projection portion or the handle on the collecting container. In other words, the comparatively heavy cartridge is disposed closer to the handle, thus obviously making the purifier better to handle.

The entire purifier may be made from plastics material so that both the collecting container and the funnel and cover can be inexpensively produced by an injection moulding process.

While previously the known funnels were loosely positioned on the collecting container on the outside thereof, in accordance with the invention the funnel is now at least partially disposed within the collecting container. That arrangement also provides that the situation in regard to the center of gravity is improved, while the handling qualities, from the point of view of the final consumer, are improved. The projection portion on the funnel serves for centering purposes or shows the consumer in a simple and logical manner the way in which the end of the funnel at the pouring side is to be associated with the corresponding side of the collecting container. In that way the bulge portion of the funnel is also positioned at the correct location, thereby making it easier to pour out the purifier.

The water purifier is filled with the water to be purified from the top, after having removed the cover by means of the knob. The water flows out of the filled funnel through the filter cartridge which is sealingly clamped in the bottom opening thereof, into the collecting container, and is then available for the consumer thereof. For the purposes of sealing against the ingress of dust or dirt, the cover is fitted on to the funnel at the top thereof, by means of the sealing conical portion on the cover.

In a preferred first embodiment of the invention, it is provided that the funnel is arranged almost completely in the collecting container, the bulge portion in the wall of the funnel at the pouring side, in the fitted condition, leaves a pouring passage, and the projection portion on the funnel at the handle side is disposed in the handle of the collecting container. In that construction, the center of gravity is influenced in a particularly advantageous fashion for the funnel sits deep in the collecting container so that, even when all the liquid is still in the funnel at the beginning of the purification operation, the water purifier still already has a stable position. In that case, the operation of pouring out the liquid is facilitated by the particular arrangement of the bulge portion in the lower part of the funnel wall. By virtue of the fact that, in accordance with the invention, a pouring passage is still left behind out of the volume of the collecting container, towards the pouring spout thereof, even when the funnel is completely accommodated in the collecting container, the funnel does not need to be tipped out. That also contributes to the novel water purifier being of a compact construction and affords improved conditions of use from the point of view of the user, especially as a filled funnel is generally not easy to move. The projection portion on the funnel at the handle side also has an advantageous effect when pouring out the purifier because when the purifier is being gripped, the thumb frequently comes to lie on the straight part at the top of the handle, beneath which the projection portion of the funnel is precisely disposed. In other words, the thumb pressure thus also ensures that the funnel is properly held in its position.

It is advantageous in accordance with the invention if, in regard to the above-described first preferred embodiment, the upper edge of the collecting container, for the purposes of forming the pouring spout, is formed as a truncated cone which is fitted to the container inclinedly with respect to the axis thereof, while in the upper part the funnel has a correspondingly matched frustoconical outside surface in which the bulge portion is disposed, at the pouring side. The entire upper edge of the collecting container is formed as an inclined truncated cone, preferably over the entire angular range of 360° when looking downwardly into the collecting container, thus providing a wide pouring spout. It has been found that that arrangement means that the purified liquid can run off over the edge in a satisfactory manner, and the stream of liquid being poured out is properly centered. While the upper frustoconical edge of the collecting container, on the side in opposite relationship to the handle, gives the desired wide pouring spout, the rear part at the handle side at the same time serves as the receiving surface for the funnel which is of a corresponding configuration.

A second preferred embodiment of the invention is characterised in that the pouring spout of the collecting container is formed by a truncated cone which is short and steep in comparison with the latter and which is disposed in an inclined position in such a way that its base surface includes an angle of from 100° to 170°, preferably about 150°, with the upper surface, along the upper edge of the collecting container. Here, a collecting container can be imagined, which is almost of cylindrical configuration with only a slight degree of conicity, flaring outwardly in an upward direction. In that arrangement, the upper edge of the collecting container is disposed approximately parallel to the surface on which the container stands. Relative to that approximately horizontal plane, the plane of the short truncated cone portion of the pouring spout is disposed at an angle as specified. That arrangement also gives a wide pouring spout which gives good pouring properties, while affording the advantages already described hereinbefore. In this second embodiment, the rear and larger part of the upper edge of the collecting container serves to accommodate the funnel. That arrangement ensures a particularly advantageous manner of mounting even when, in accordance with the invention, it is further provided that the funnel is arranged approximately half in the collecting container, a support flange which extends around the funnel is carried thereon at the halfway height position, and the upper wall of the funnel, which projects out of the collecting container, is formed by an inclined truncated cone in such a way that, at the pouring side, the wall is higher than at the handle side. By virtue of the support flange and the funnel, half of which projects upwardly out of the collecting container, either the collecting container can be made shorter and more compact, or, while being of the same height as in the other embodiment, it is possible to store a larger volume of water therein. By virtue of the upward extension of the wall of the upper inclined truncated cone portion, at the pouring side, liquid does not flow out of the funnel even when it is in an inclined position, when pouring out the container.

In another advantageous embodiment of the invention, the wall on the funnel, which is extended to a higher level on the pouring side, is extended downwardly and forwardly to the pouring spout of the collecting container, wherein in accordance with the invention the support flange on the funnel is extended forwardly at the pouring side to form a pouring spout cover means. As described above, the upwardly extended wall which prevents water from splashing or slopping out, together with the support flange, as a means for preventing the ingress of dirt or dust, can be extended downwardly over the entire pouring spout. It will be appreciated that in that way the collecting container is substantially covered upwardly so that, in accordance with the invention, it is desirable if in addition the projection portion on the funnel is formed as a tilting lever for tilting the funnel out of the collecting container. The tilting lever is preferably disposed in an inclined position with respect to the horizontal, for example in side view approximately in the form of a V, with the tip of the V forming the pivot point. When pouring out the purifier, the thumb of the person using the purifier bears on the tilting lever so that, when pressure is applied, the funnel is lifted and the pouring spout is opened. By virtue of the eccentric positioning of the opening in the bottom of the funnel and the corresponding eccentric positioning of the filter cartridge, there is the further advantage that, when the funnel is tilted out of the collecting container, the cartridge does not touch the walls of the collecting container because the length of the tilting movement is increased.

It is advantageous in regard to both the embodiments described herein if, in accordance with the invention, a gripping groove is provided in the knob on the cover. The groove assists with facilitating handling by the final consumer, especially as the cover is a comparatively firm and tight fit on the funnel. That has the advantage that, when prematurely pouring out liquid from the purifier, that is to say, when there is still liquid to be purified in the funnel, the liquid does not splash out all too easily even when the funnel is tipped into an inclined position together with the collecting container before the funnel is tilted out of the collecting container. On the other hand, the groove permits the cover to be removed from the funnel without applying a force.

It is also advantageous, in accordance with the invention, if a vent groove is disposed in the upper edge of the collecting container, preferably beside the handle. As the funnel rests on the collecting container with a comparative seal at that point, due to the funnel walls being of a configuration which matches the walls of the collecting container, the filtered water could only slowly flow into the collecting container, because in particular in the construction without the permanent pouring passage, no air could flow away. That is advantageously achieved by virtue of the vent groove.

Similarly, it is advantageous if, in accordance with the invention, a vent opening is provided in the cover. Such a hole prevents a vacuum suction effect in the funnel if water to be purified is to pass through the filter cartridge into the collecting container.

Further advantages, features and possible uses of the present invention will be apparent from the following description of preferred embodiments in conjunction with the drawings in which:

FIGS. 1 to 5 show a first embodiment of the invention, and

FIGS. 6 to 10 show a second embodiment of the invention, in which:

FIG. 1 shows a side view of the purifier generally,

Figure 4B:
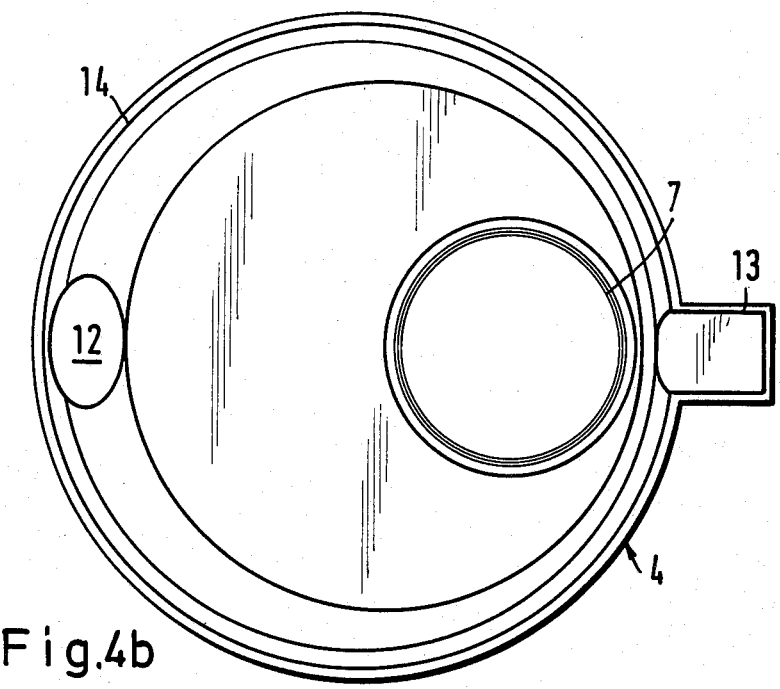
Figure 4A:
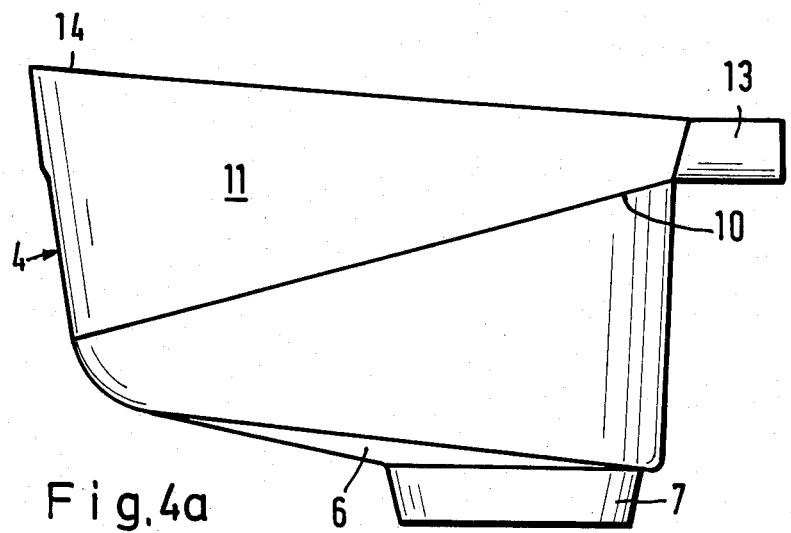
Figure 5B:
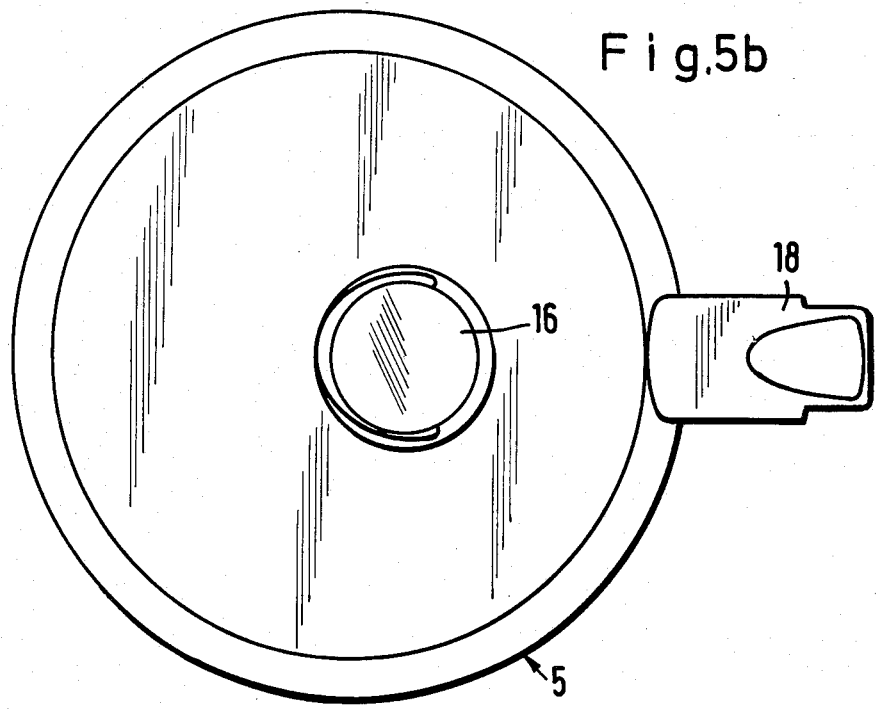
Figure 5A:
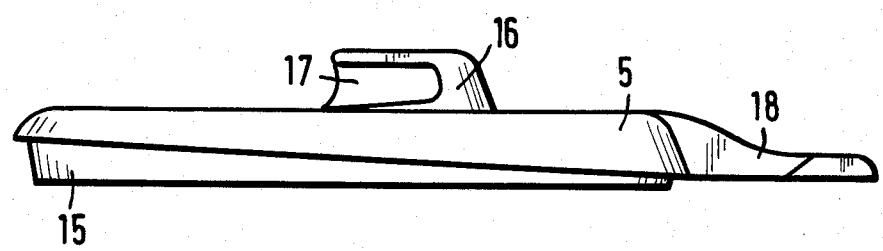
Figure 8B:
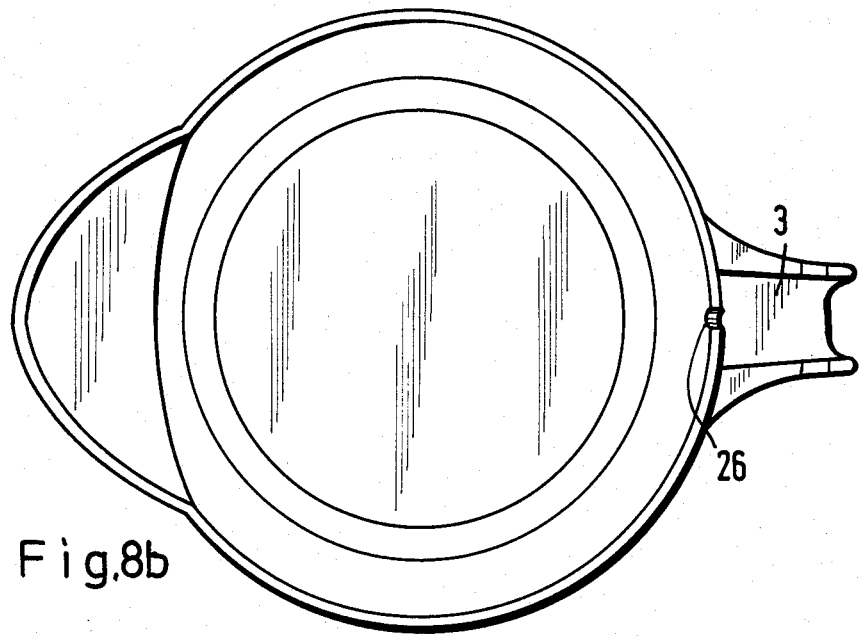
Figure 8A:
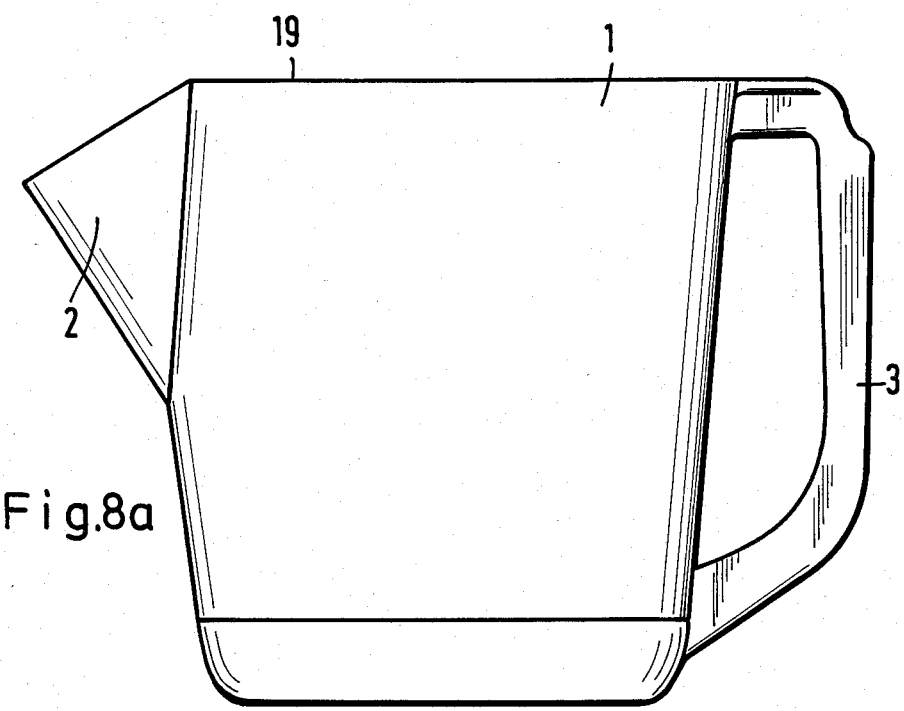
Figure 9B:
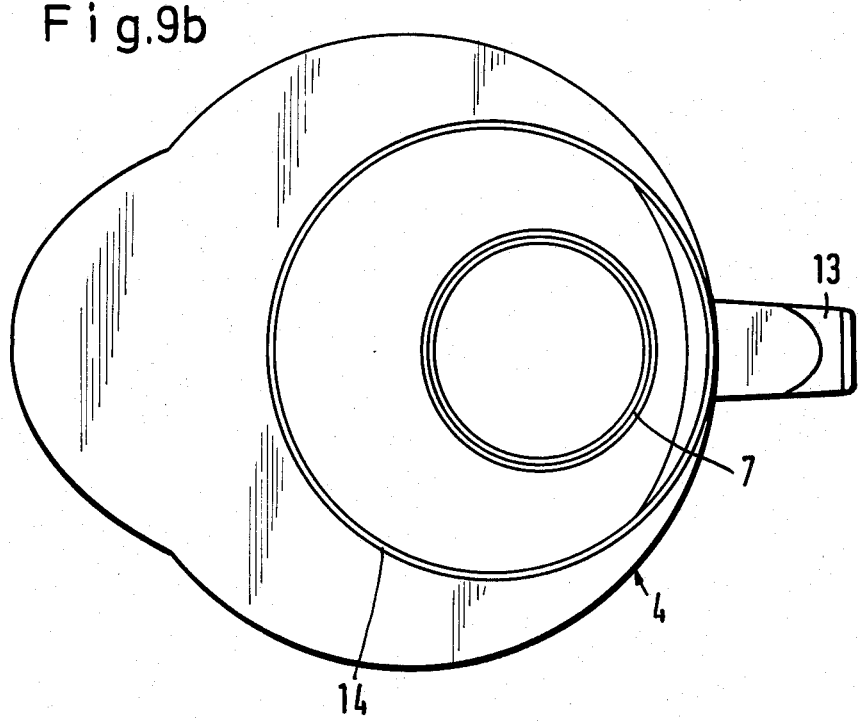
Figure 9A:
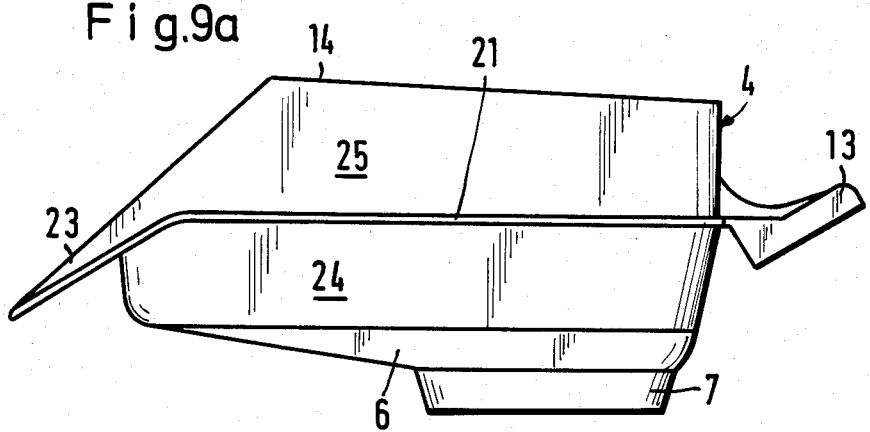
Figures 10A, 10B:
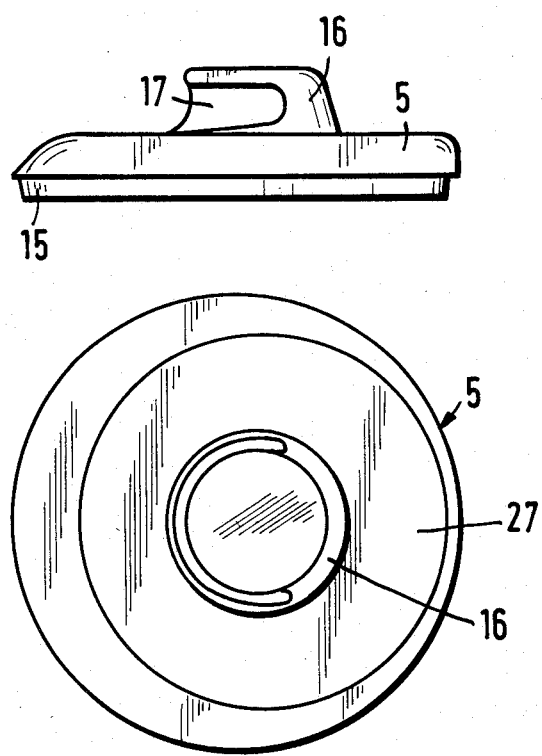

FIGS. 2a to 2c show the three parts of the water purifier, in the disassembled condition thereof, FIG. 3a shows a diagrammatic side view of the collecting container, FIG. 3b shows a plan view thereof, FIG. 4a shows a diagrammatic side view of the funnel, FIG. 4b shows a plan view thereof, FIG. 5a shows a diagrammatic side view of the cover, FIG. 5b shows a plan view thereof, FIG. 6 shows a side view of the entire water purifier of the second embodiment in the assembled condition, FIGS. 7a to 7c show the purifier of FIG. 6, but with the three parts thereof in the disassembled condition, FIG. 8a shows a side view of the collecting container of the second embodiment, FIG. 8b shows a plan view thereof, FIG. 9a shows a diagrammatic side view of the funnel of the second embodiment, FIG. 9b shows a plan view thereof, FIG. 10a shows a plan view of the cover, and FIG. 10b shows a side view thereof.

The water purifier in both embodiments comprises the collecting container or vessel 1 which is provided with the pouring spout 2 at the front thereof and the handle 3 at the rear thereof, the funnel 4 and the cover 5 for closing off the funnel. Formed at the bottom 6 of the funnel 4 is a bottom opening 7 into which the filter cartridge (not shown) which contains the purifying agent can be clampingly pressed. All parts of the water purifier comprise plastics material and are formed in one piece.

Figure 1:
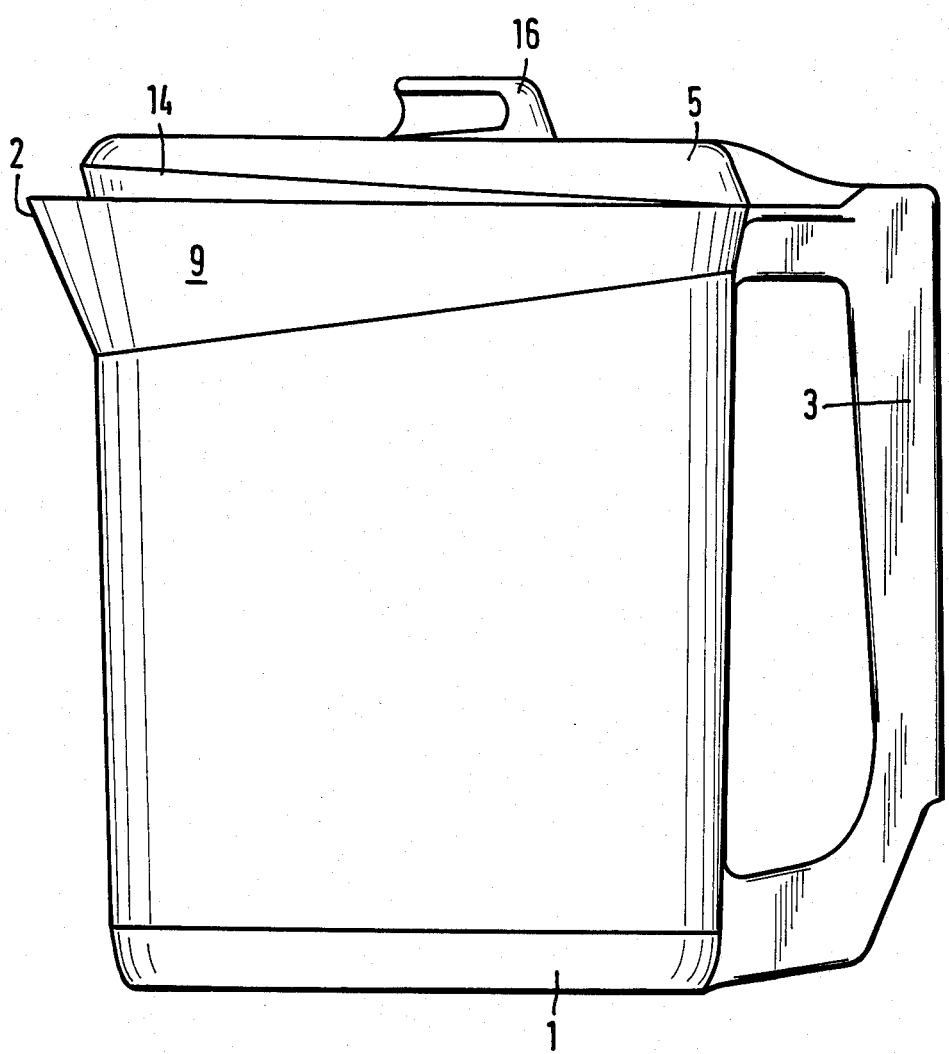

First of all, the first embodiment will be described with reference to FIGS. 1 to 5. FIGS. 1, 2a and 3a show the almost cylindrical form of the collecting container 1 which, for production reasons, is of an only slightly conical form, flaring outwardly in an upward direction. The upper part of the handle 3 is hollow and preferably transparent. It is also possible for the entire handle 3 to be in the form of a transparent hollow member in order in that way to provide an indication of the level of water in the collecting container 1, if the latter is not transparent. As shown in FIGS. 2a and 3a, the line 8 separates the lower frustoconical portion and the cylindrical peripheral surface respectively of the collecting container 1, from the frustoconical edge portion 9 which is disposed inclinedly on the top thereof. If an axis (not shown) is imagined to pass through the centre of the collecting container 1, in a perpendicular direction, then the axis of the inclined frustoconical configuration of the upper edge portion 9 of the collecting container 1, is disposed at an angle to the axis of the conainer, which is preferably between 5° and 30°, more preferably between 10° and 20°. The pouring spout is formed by the above-mentioned upper edge portion 9 and the inclination or skew of its frustoconical configuration, the axis of which is inclined towards the pouring spout 2.

In this connection, in particular the views shown in FIGS. 2a and 2b show that (separated by the line 10 in the funnel 4), the funnel wall which is disposed thereabove, that is to say, the funnel 4 in the upper portion, has a correspondingly matched frustoconical outside surface 11. When the funnel 4 is fitted into the collecting container, the above-mentioned frustoconical outside surface 11 bears against the frustoconical upper edge portion 9 of the collecting container 1, which is of the same configuration.

As the above-mentioned bulge portion 12 (see FIG. 4b) is arranged at the pouring side (at the left in the drawings), in this embodiment, a pouring passage is left free, by means of the bulge portion 12, even when the funnel 4 is disposed completely in the collecting container 1, as shown in FIG. 1. In that condition, the projection portion 13 on the funnel 4, on the handle side, is also disposed in the handle 3.

While the plane connecting the top edge of the upper portion 9 of the collecting container 1 is disposed substantially horizontally if the purifier is standing on a horizontal surface, the plane formed by the upper edge 14 of the funnel 4 can be seen to be disposed at an angle with respect to the horizontal, in such a way that the end on the pouring side (at the left) is higher than the opposite end at the handle side. That arrangement reduces splashing over of the liquid in the funnel 4, even when the entire purifier is tilted for pouring out the liquid, in the assembled condition as shown in FIG. 1.

The above-mentioned phenomenon of the liquid splashing out is primarily excluded by virtue of the fact that the cover 5 is tightly fitted by means of the sealing cone 15 in the upper edge 14 of the funnel 4. Because the sealing cone 15 of the cover 5 is higher at the pouring side than at the handle side, the plane which passes through the top surface of the cover 5 is again horizontal and parallel to the surface on which the purifier stands.

A gripping knob 16 with gripping groove 17 is fixed on the top of the cover 5. In addition, disposed on the cover 5 at the handle side thereof is a projection portion 18 which, in order to facilitate centering of the overall construction or proper assembly of the components of the purifier, is fitted into the rearward upper part of the handle 3 on the collecting container 1.

Many features of the arrangement illustrated in connection with the first embodiment with reference to FIGS. 1 to 5 are also to be found in the second embodiment which will now be described with reference to FIGS. 6 to 10. The same components are denoted by the same reference numerals so that the description, being the same, does not have to be repeated here.

Although the collecting container 1 is also an approximately cylindrical configuration, it will be seen however upon making a comparison between FIGS. 1 and 6 that the opening cone configuration in the second embodiment is somewhat larger than that of the first embodiment.

The collecting container 1 which is shown in particular in FIGS. 7a and 8a has an upper edge 19 which is disposed in a plane which is parallel to the plane on which the purifier stands, that plane preferably being horizontal. The pouring spout 2 in this second embodiment, on the collecting container 1 at the front thereof, is formed by a short frustoconical configuration of the collecting container 1. In addition, its central axis is at an angle to the main axis of the collecting container 1 in such a way as to provide the downwardly extended pouring spout 2 in FIG. 7a. In that fashion, the plane which passes through the upper edge 9 of the collecting container 1 and the plane which passes through the base surface 20 of the pouring spout include an angle α of about 150°.

In the second embodiment also, the funnel 4 is adapted to the configuration of the upper walls of the collecting container 1. As shown in FIGS. 7b and 9 however, the funnel 4 is formed as a member for mounting on the collecting container 1 and has a support flange 21 which, at the pouring side, is formed forwardly at 22 as a pouring spout cover means 23. The support flange 21 divides the funnel wall generally into two parts, namely the lower part 24 and the upper part 25. As shown in FIG. 6, the lower part 24 of the funnel wall is disposed in the collecting container 1 while the upper part 25 of the container wall sticks out. The upper edge of the funnel 4 is again extended upwardly at the pouring side so that the liquid in the funnel cannot readily splash or slop out even when the entire container is tilted. somewhat, in the position shown in FIG. 6. The slight upward extension of the upper edge 14 of the funnel 4 can naturally only favour that effect and represent an auxiliary measure, for basically, in the second embodiment, the funnel 4 is to be tilted out of the collecting container 1 by means of the projection portion 13 which is formed as a tilting lever.

Also provided in the upper edge 19 of the collecting container 1, beside the handle 3, is a vent groove 26 (see FIG. 8b) in order to permit air to escape from the collecting container 1 when liquid flows through the filter cartridge into the container 1. A vent opening 27 (see FIG. 10a) is provided in the cover 5 for a similar purpose.

The wide, conical pouring means 2 ensures that the liquid can be poured out in a convenient and drip-free manner, providing an advantageous break-away edge at which therefore the flow of liquid from the spout breaks away from the wall thereof. The funnel 4 can be covered in a dust-free manner, even with the forwardly downwardly extended pouring spout 2 in the second embodiment, being covered in that case more particularly by the cover means 23. That arrangement also prevents water from splashing over the edge when the purifier is being transported. Due to the center of gravity being at a lower location, that arrangement provides for easier and secure handling of the entire purifier, even when the funnel is filled.

With the arrangement shown in FIG. 1, there is also the advantage that both the lip edge of the collecting container 1 and that of the funnel 4 are equal in height. The side view of the complete apparatus shows in FIG. 1 how, at the side with the handle 3, the upper edge 14 of the funnel 4 converges downwardly and towards the right to the level or the upper edge of the collecting container 1, and terminates therewith.

Having regard to the principle of communicating tubes, because the overflow lip edges of the two containers are identical in height, that arrangement gives the advantage that the water can virtually never overflow out of the collecting container 1 if too much was poured into the funnel 4. More particularly, if it is assumed that the collecting container 1 is not transparent and is already half filled with water, and if the other user does not look at the level of water in the collecting container but pours fresh water into the funnel, nonetheless the collecting container cannot then overflow for there is always a condition of pressure balance as between the funnel and the collecting container, and therefore the funnel will have the same level of water as the collecting container, as shown in FIG. 1 in the assembled condition.

In other words, the arrangement according to the invention means that the funnel 4 can only ever be filled as far as the upper edge of the collecting container 1. Unintentional overflow is prevented.

I claim:
1. A water purifier comprising:
 (a) a collecting container having a handle and an outwardly extended pouring spout positioned substantially opposite said handle, the top portion of said container tapering outward from the bottom portion;
 (b) a removable funnel receivably fitted within at least a portion of the top of said collecting container;
 (c) the outer contour of the lower portion of said funnel substantially matching the inner contour of the upper portion of said collecting container;
 (d) said funnel angularly fitting within said collecting container so that the portion of the funnel wall closest to the pouring spout extends higher than the portion of the funnel wall closest to said handle;
 (e) said funnel having an offset opening in the bottom thereof to receive a filter cartridge, said opening positioned closer to said handle than to said pouring spout to provide a favorable distribution of weight when a filter cartridge is positioned in the bottom of said funnel;
 (f) a removable cover fitted atop said funnel to provide a means for easy opening and filling of said container; and
 (g) a pouring passage connecting the internal bottom portion of said collecting container with said pouring spout to provide a means for convenient emptying of said container.

2. The water purifier of claim 1 wherein said collecting container is substantially cylindrical.

3. The water purifier of claim 1 wherein said pouring passage is formed by a portion of the inner wall of said collecting container and a portion of the outer wall of said funnel separated by a bulge in said funnel wall.

4. The water purifier of claim 1 wherein said pouring spout is in the shape of a truncated cone.

5. The water purifier of claim 1 wherein said pouring spout extends at an angle between about 100° and about 170° from vertical.

6. The water purifier of claim 1 wherein a portion of said funnel extends outward and forms a cover over said pouring spout.

7. The water purifier of claim 1 wherein a portion of said funnel extends outward over said handle and provides a lever for lifting said funnel.

8. The water purifier of claim 1 wherein said cover has a gripping knob and said knob has a gripping groove.

9. The water purifier of claim 1 wherein the upper internal wall of said collecting container has a venting groove therein.

10. The water purifier of claim 1 wherein said cover has a vent therein.

* * * * *